United States Patent [19]
Kim et al.

[11] Patent Number: 5,860,077
[45] Date of Patent: Jan. 12, 1999

[54] THREE-DIMENSIONAL DATA STORING METHOD FOR PARALLEL ACCESS OF VERTEX DATA

[75] Inventors: Jin-goo Kim; Chae-gon Oh, both of Suwon, Rep. of Korea

[73] Assignee: Samsung Electronics Co., Ltd., Kyungki-do, Rep. of Korea

[21] Appl. No.: 763,291

[22] Filed: Dec. 10, 1996

[30] Foreign Application Priority Data

Apr. 2, 1996 [KR] Rep. of Korea ............... 1996 9869

[51] Int. Cl.$^6$ ................................................. G06F 12/00
[52] U.S. Cl. ........................ 711/1; 711/202; 345/431
[58] Field of Search ............................ 345/431; 711/1, 711/5, 154, 202, 217, 220

[56] References Cited

U.S. PATENT DOCUMENTS

| | | | |
|---|---|---|---|
| 5,247,630 | 9/1993 | Parks | 711/1 |
| 5,392,393 | 2/1995 | Deering | 345/505 |
| 5,651,106 | 7/1997 | Ashburn | 345/441 |
| 5,771,045 | 6/1998 | Ghavam | 345/423 |

Primary Examiner—Tod R. Swann
Assistant Examiner—Christopher S. Chow
Attorney, Agent, or Firm—Sughrue, Mion, Zinn, Macpeak & Seas, PLLC

[57] ABSTRACT

A three-dimensional data storing method for storing three-dimensional (3-D) data on cubical vertices belonging to a cube, the method includes the steps of: index-numbering each vertex of the three-dimensional data so that cubical vertices on the surface belonging commonly to two neighboring cubes have the same index number; classifying the 3-D data according to each index number; and storing the classified 3-D data in a plurality of memories corresponding to each index number, whereby the three-dimensional data can be accessed in parallel.

4 Claims, 2 Drawing Sheets

THREE-DIMENSIONAL DATA STORING METHOD FOR PARALLEL ACCESS OF VERTEX DATA

BACKGROUND OF THE INVENTION

The present invention relates to a 3-D data storing method, and more particularly to a 3-D data storing method capable of accessing the data of eight cubical vertices belonging to a cube during a memory access cycle.

The term 3-D data refers to data groups which are arranged in a mesh structure. This arrangement is chiefly used for color correction in a color television. For interpolating a color value of a point around a known point in the color space expressed by the three primary colors, i.e. red, green and blue, the color values of the known point and eight cubical vertices surrounding the known point should be known.

According to a conventional method, the 3-D data is sequentially stored in a single memory, thus requiring eight memory accessing operations for reading the color values of the eight cubical vertices. That is, to acquire the data of the cubical vertices of a cube, eight memory accessing operations are required. Such a conventional method limits the operating speed of a system for processing 3-D data, thus making real-time processing difficult.

SUMMARY OF THE INVENTION

The object of the present invention is to eliminate or lessen the above problem by providing a 3-D data storing method capable of performing more rapid data access.

To achieve the object, there is provided a three-dimensional data storing method for storing three-dimensional (3-D) data on cubical vertices belonging to a cube, the method including the steps of: index-numbering each vertex of the three-dimensional data so that cubical vertices on the surface belonging commonly to two neighboring cubes have a same index; classifying the 3-D data according to each index number; and storing the classified 3-D data in a plurality of memories corresponding to each index number, whereby the three-dimensional data can be accessed in parallel.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
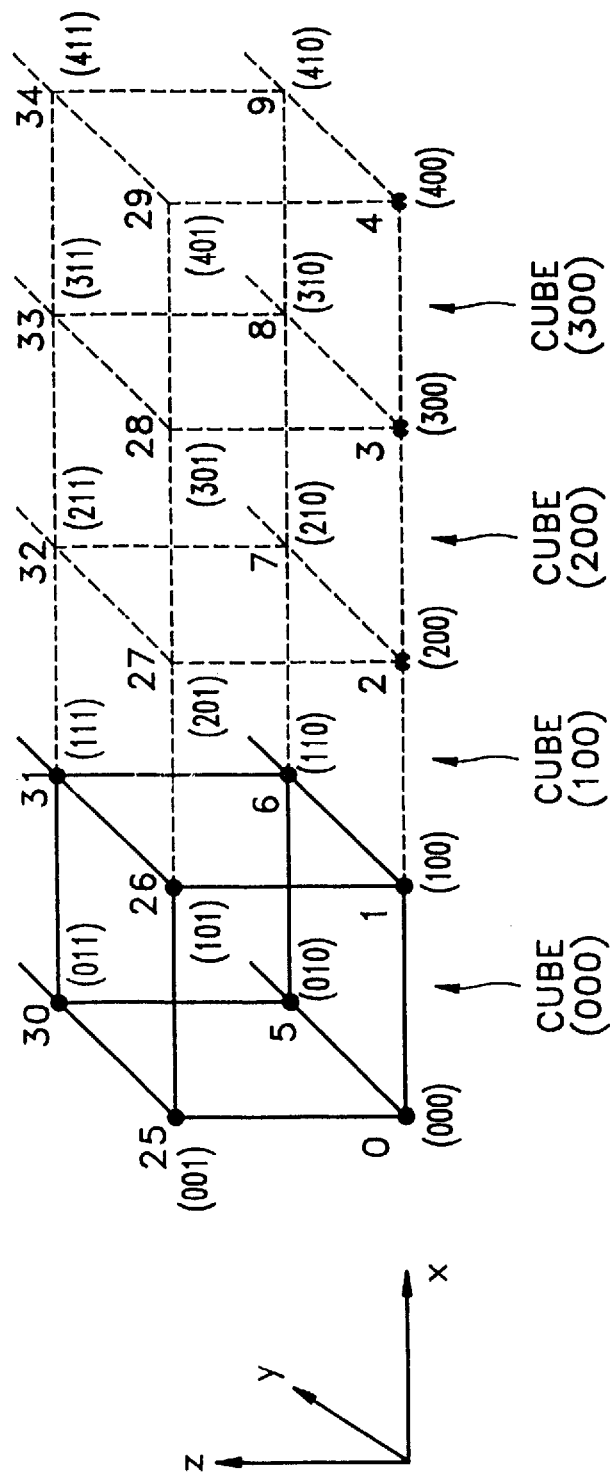
FIG. 1 shows a structure of 3-D data.

FIG. 1 shows part of 3-D data with a size of 4×4×4. In FIG. 1, x, y and z are axes of the 3-D coordinate system, and the coordinate of a cubical vertex is expressed as (xyz) Here, the coordinate of an origin is (000), and the coordinates of the vertices positioned on the points moved by one in the direction of each axis from the origin are (100), (010), and (001) respectively.

A conventional 3-D data storing method will be described with reference to Table 1.

TABLE 1

| address | coordinate |
|---------|------------|
| 0 | (000) |
| 1 | (100) |
| 2 | (200) |
| 3 | (300) |
| 4 | (400) |
| 5 | (010) |
| 6 | (110) |
| 7 | (210) |
| . | . |
| . | . |
| . | . |
| 25 | (001) |
| 26 | (101) |
| 27 | (201) |
| 29 | (401) |
| 30 | (011) |
| 31 | (111) |
| . | . |
| . | . |
| . | . |

In Table 1, the left column indicates a memory address and the right column indicates the coordinate of a cubical vertex stored in the address. The storage sequence is as follows.

First, the coordinate values of the cubical vertices in the (xy) plane where the value of z is zero are stored, and then those in the (xy) planes where the values of z are 1, 2, and . . . , are sequentially stored.

In addition, in each (xy) plane, the coordinate values of the vertices on the x line where the value of Y is zero and those on the x lines where the values of y are 1, 2, . . . , are sequentially stored.

Let us consider when the vertices are indexed as one of 0, 1, 2, . . . , and 7, and the addresses thereof are ADD0, ADD1, ADD2, . . . , and ADD7 respectively. If so, the addresses where the data of the vertices belonging to a coordinate (xyz) are stored respectively are as follows.

$$ADD_n = x + (y \times 5) + (z \times 25),$$

here, n=0, 1, . . . , 7.

According to the above equation, in a cube whose coordinate is (000), the coordinates of eight cubical vertices belonging thereto are 000, 100, 010, 110, 001, 101, 011, and 111 respectively and the memory addresses thereof are 0, 1, 5, 25 6, 25, 26, 30, and 31 respectively.

Consequently, it can be seen that the accessing operation should be sequentially performed eight times from ADD0 to ADD7 in order to obtain the data on eight vertices belonging to a cube whose coordinate is (xyz).

Such sequential accessing limits the operation speed of a system using 3-D data.

To prevent such a problem and reduce data access time, as shown in FIG. 1, a method can be used by which the coordinate values of the cubical vertices with the same index number are gathered and stored in eight memories respectively to be accessed at the same time.

Such a method, however, wastes memory space, because the cubical vertex commonly belonging to neighboring cubes has two indices.

For example, the cubical vertex corresponding to coordinate (100) has the index number 1 with respect to a first cube, and index number 0 with respect to a second cube at the same time, so that storing the indices requires a huge memory space.

According to the present invention, the cubical vertices are distributed so that the indices thereof are not duplicated, and stored in eight memories so that parallel access can be possible. Such a method includes an index numbering step, a classification step and a storing step.

The index numbering step corresponds to a pre-processing step for distributing and storing the 3-D data without duplication so that parallel access thereto can be possible.

In this step, indexing is performed so that the cubical vertices in the surface belonging commonly to two neighboring cubes respectively have a common index number.

Figure 2:
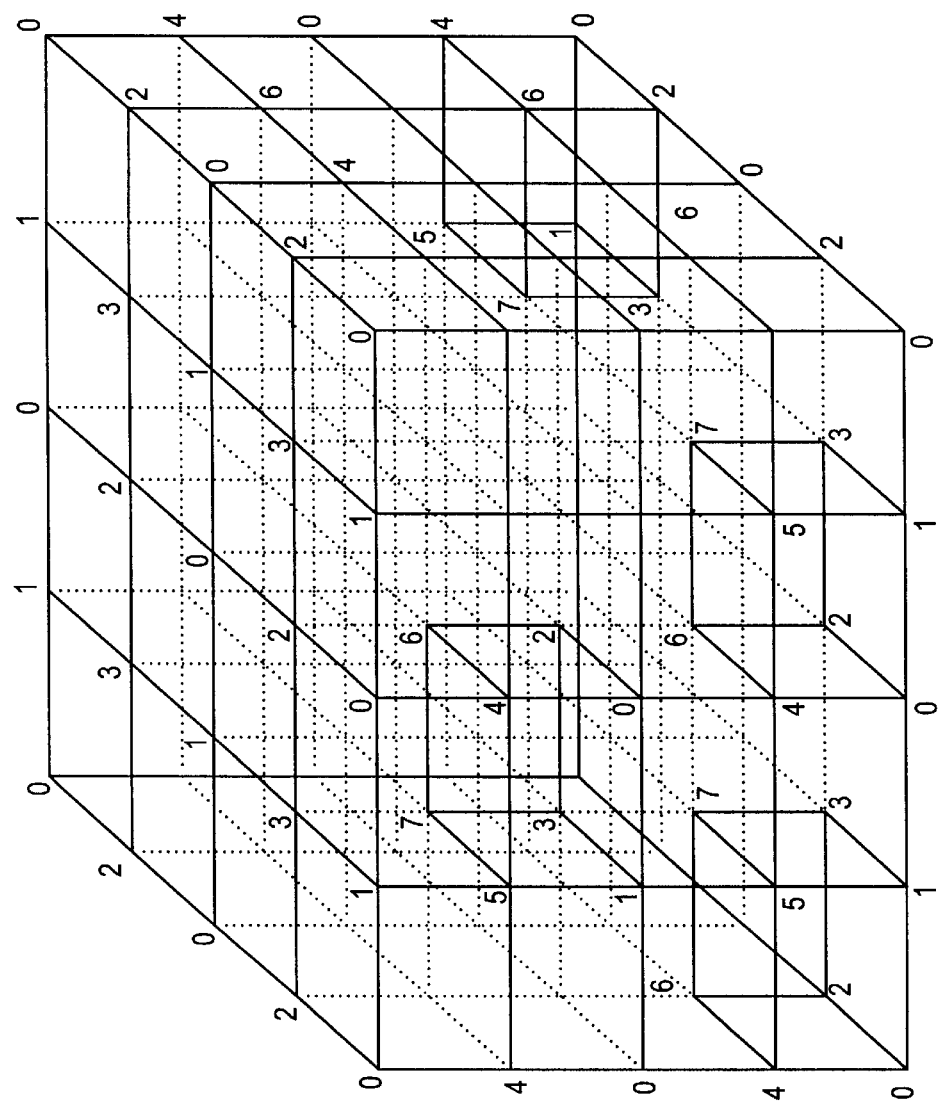
FIG. 2 shows the result of assigning index numbers in a 3-D data storing method according to an embodiment of the present invention.

FIG. 2 shows the result of the index numbering step which is applied to a data structure with dimensions of 4×4×4.

Comparing the data structure shown in FIG. 2 with that of FIG. 1, the indices of the cubical vertices in the surface in common belonging to the neighboring cubes are unified. That is, no cubical vertex has two memory addresses and thus the memory is used effectively.

In the classification step, the cubical vertices are classified according to the index numbers given thereto. Table 2 shows the number of cubical vertices classified according to each index number.

TABLE 2

| index number | 0 | 1 | 3 | 4 | 5 | 6 | 7 |
|---|---|---|---|---|---|---|---|
| quantity | 27 | 18 | 12 | 18 | 12 | 12 | 8 |

In Table. 2, the numbers of the cubical vertices belonging to the index number are different because the indexing is performed in such a manner that duplicated vertices have the same index number, respectively.

Referring to FIG. 2, the number of the cubical vertices with an index number of zero is three in the direction of x, three in the direction of y, and three in the direction of z, that is, 27 in total. Moreover, the number of the cubical vertices with an index number of 1 is two in the direction of x, three in the direction of y, and three in the direction of z, that is 18 in total. In the same manner, the number of cubical vertices with index numbers of 2 to 7 are 18, 12, 18, 12, 12, and 8 respectively.

The storing step is for distributively storing the cubical vertex data classified according to each index into eight memories. Here, when the same indexed cubical vertices are stored in the same memory address, data is stored in the sequence of x, y and z in a manner similar to the conventional method in order to secure address prediction.

The data on cubical vertices belonging to a cube stored in each memory is accessed in parallel, and is output at the same time.

At this time, assuming that the memories correspond to indices MEM 0, MEM1, ... , MEM7 respectively, the addresses applied to the memories respectively, ADD_MEM0, ADD_MEM1, ... , ADD_MEM7 in correspondence to a coordinate (xyz) are determined as follows.

ADD_MEM0=$((x+1)/2)+((y+1)/2\times3)+((z+1)/2\times9)$

ADD_MEM1=$x/2+((y+1)/2\times3)+((z+1)/2\times6)$

ADD_MEM2=$((x+1)/2)+(y/2\times3)+((z+1)/2\times6)$

ADD_MEM3=$x/2+(y/2\times3)+((z+1)/2\times6)$

ADD_MEM4=$((x+1)/2)+((y+1)/2\times3)+(z/2\times9)$

ADD_MEM5=$x/2+((y+1)/2\times2)+(z/2\times6)$

ADD_MEM6=$((x+1)/2)+(y/2\times3)+(z/2\times6)$

ADD_MEM7=$x/2+(y/2\times2)+(z/2\times4)$

In the above expressions, "/" indicates an integer division operation which truncates the fraction part in the result. For example, ½ gives 0. Here, the operators are calculated from left to right. For example, for ½×3, ½ is computed first whose result is 0, and then 0×3 is calculated.

When the memory addresses ADD_MEM0 through ADD_MEM7 which are determined according to the above equations are applied, each memory outputs the cubical vertices belonging to a cube whose coordinate is (xyz). Thus, the necessary data on eight cubical vertices can be obtained at the same time by only a one-time accessing operation.

Consequently, the operation speed of a 3-D data processing system is not influenced by the memory access and thus a real-time operation is possible.

As described above, a 3-D data storing method according to an embodiment of the present invention is effective to improve the operation speed of a 3-D data processing system because the data on the cubical vertices belonging to a cube can be accessed by a one-time memory accessing operation.

What is claimed is:

1. A method for storing three-dimensional (3-D) data on cubical vertices belonging to a cube, said method comprising the steps of:

index-numbering each vertex of said three-dimensional data so that cubical vertices on a surface belonging commonly to two neighboring cubes have a same index;

classifying said 3-D data according to each index number; and storing said classified 3-D data in a plurality of memories corresponding to each index number, thereby providing parallel access to said three-dimensional data.

2. A three-dimensional data storing method as claimed in claim 1, wherein said storing step is performed in a sequence of coordinate axes constituting 3-D coordinate system.

3. A three-dimensional data storing method as claimed in claim 2, wherein said 3-D coordinate system is an (xyz) coordinate system.

4. A three-dimensional data storing method as claimed in claim 3, wherein said storing step comprises assigning memories corresponding to indices MEM0, MEM1, MEM2, MEM3, MEM4, MEM5, MEM6, MEM7, with respective addresses ADD_MEM0, ADD_MEM1, ADD_MEM2, ADD_MEM3, ADD_MEM4, ADD_NEM5, ADD_MEM6, ADD_MEM7, according to the following equations:

ADD_MEM0=$((x+1)/2)+((y+1)/2\times3)+((z+1)/2\times9)$

ADD_MEM1=$x/2+((y+1)/2\times3)+((z+1)/2\times6)$

ADD_MEM2=$((x+1)/2)+(y/2\times3)+((z+1)/2\times6)$

ADD_MEM3=$x/2+(y/2\times3)+((z+1)/2\times6)$

ADD_MEM4=$((x+1)/2)+((y+1)/2\times3)+(z/2\times9)$

ADD_MEM5=$x/2+((y+1)/2\times2)+(z/2\times6)$

ADD_MEM6=$((x+1)/2)+(y/2\times3)+(z/2\times6)$

ADD_MEM7=$x/2+(y/2\times2)+(z/2\times4)$, where "/" indicates an integer division operation which truncates a fraction part in a result.

* * * * *